(12) United States Patent
Stumpf et al.

(10) Patent No.: US 9,074,647 B2
(45) Date of Patent: Jul. 7, 2015

(54) BRAKE LINING WEAR INDICATOR, DISC BRAKE HAVING SUCH AN INDICATOR AND BRAKE SHOES FOR SUCH A DISC BRAKE

(75) Inventors: Martin Stumpf, Lampertheim (DE); Wolfgang Falter, Heidelberg (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 56 days.

(21) Appl. No.: 13/878,200

(22) PCT Filed: Oct. 10, 2011

(86) PCT No.: PCT/EP2011/005059
§ 371 (c)(1),
(2), (4) Date: Aug. 5, 2013

(87) PCT Pub. No.: WO2012/052121
PCT Pub. Date: Apr. 26, 2012

(65) Prior Publication Data
US 2013/0306410 A1    Nov. 21, 2013

(30) Foreign Application Priority Data

Oct. 20, 2010    (DE) .......................... 10 2010 048 988

(51) Int. Cl.
*F16D 66/02* (2006.01)

(52) U.S. Cl.
CPC ............ *F16D 66/026* (2013.01); *F16D 66/024* (2013.01)

(58) Field of Classification Search
CPC ..... F16D 66/02; F16D 66/022; F16D 66/026; F16D 66/024
USPC ........................... 188/1.11 L, 1.11 W, 1.11 R
See application file for complete search history.

(56) References Cited

U.S. PATENT DOCUMENTS

| | | | | |
|---|---|---|---|---|
| 3,976,167 A * | 8/1976 | Hirai et al. | ............... | 188/1.11 R |
| 5,307,673 A * | 5/1994 | Ito et al. | ........................ | 73/129 |
| 5,608,376 A * | 3/1997 | Ito et al. | ....................... | 340/454 |
| 5,637,794 A * | 6/1997 | Hanisko | ........................ | 73/121 |
| 5,692,585 A * | 12/1997 | Kazuro et al. | .......... | 188/1.11 W |
| 5,833,033 A * | 11/1998 | Takanashi | ............... | 188/1.11 L |
| 5,939,978 A * | 8/1999 | Kyrtsos | ........................ | 340/454 |
| 6,065,359 A * | 5/2000 | Takanashi et al. | ........... | 73/866.5 |
| 6,095,290 A * | 8/2000 | Takanashi | ............... | 188/1.11 L |
| 6,158,275 A * | 12/2000 | Asao et al. | ..................... | 73/121 |
| 6,179,091 B1 * | 1/2001 | Takanashi | ............... | 188/1.11 L |
| 6,290,027 B1 * | 9/2001 | Matsuzaki | ............... | 188/1.11 L |

(Continued)

FOREIGN PATENT DOCUMENTS

DE    9010354 U1    9/1990
DE    4301129 C1    11/1993

(Continued)

*Primary Examiner* — Thomas Irvin
(74) *Attorney, Agent, or Firm* — Schwabe Williamson & Wyatt PC (57) ABSTRACT

The invention relates to a device for indicating wear on the friction lining of a brake shoe of a disc brake, having an electrically conductive unit which comes into electrical contact with the brake disc when a first predetermined wear limit is reached during braking, wherein the electrically conductive unit is elongate and a section adjacent to the section lying closest to the brake disc in the installed state forms an angle between 0° and 90°, preferably between 2° and 20°, more preferably between 8° and 16° with the plane of the brake disc. Other embodiments may be described and/or claimed.

15 Claims, 4 Drawing Sheets

(56) References Cited

U.S. PATENT DOCUMENTS

| | | | |
|---|---|---|---|
| 6,338,397 B1 * | 1/2002 | Gezgin et al. | 188/1.11 L |
| 6,360,850 B1 * | 3/2002 | Odisho et al. | 188/1.11 L |
| 6,366,201 B1 * | 4/2002 | Hanisko | 340/454 |
| 6,415,658 B1 * | 7/2002 | Takanashi et al. | 73/121 |
| 6,450,300 B1 * | 9/2002 | Kramer | 188/1.11 L |
| 6,477,893 B1 * | 11/2002 | Djordjevic | 73/129 |
| 6,719,102 B2 * | 4/2004 | Takanashi | 188/1.11 L |
| 6,725,977 B2 * | 4/2004 | Takanashi | 188/1.11 L |
| 7,165,657 B2 * | 1/2007 | Palladino | 188/1.11 L |
| 8,434,353 B2 * | 5/2013 | Lachermeier | 73/121 |
| 2010/0253497 A1 * | 10/2010 | Bakker et al. | 340/454 |

FOREIGN PATENT DOCUMENTS

| | | | | |
|---|---|---|---|---|
| DE | 4239179 | A1 | 5/1994 | |
| DE | 202008013226 | U1 | 2/2009 | |
| EP | 2175158 | A1 * | 4/2010 | |
| EP | 2182236 | A1 * | 5/2010 | F16D 66/02 |
| FR | 2937698 | A1 * | 4/2010 | |

* cited by examiner

BRAKE LINING WEAR INDICATOR, DISC BRAKE HAVING SUCH AN INDICATOR AND BRAKE SHOES FOR SUCH A DISC BRAKE

CROSS REFERENCE TO RELATED APPLICATIONS

The present application is a 35 U.S.C. §371 national phase entry application of, and claims priority to, International Patent Application No. PCT/EP2011/005059, filed Oct. 10, 2011, which claims priority to German Patent Application No. DE102010048988.3, filed Oct. 20, 2010, the disclosures of which are hereby incorporated by reference in their entirety for all purposes.

TECHNICAL FIELD

The invention relates to a device for indicating the wear of a friction lining of a shoe of a disc brake, having an electrically conducting mechanism which, when a first predetermined wear limit is reached during braking, comes in electrical contact with the brake disc.

BACKGROUND

Disc brakes are known which exhibit a shoe with a carrier plate and a friction lining. During braking, the shoe presses against the brake disc. By this means, over time the friction lining is subject to wear.

For monitoring of the friction lining width, especially for determining whether a permissible wear limit of the friction lining has not been reached, it is known to place electrical contact wires—cables, for example—in the friction lining. The contact wire is mounted roughly in a radial outer area of the brake shoe on the carrier plate. This area often is free of the friction lining. Thus, for this, the friction lining often exhibits an opening. When the wear limit is reached, thus when the friction lining has been worn away accordingly, the contact cable comes in contact with the brake disc during braking, and is also abraded. By this means an electrical impulse is issued to a signal detector, and a warning notice is issued that the permissible residual shoe thickness has been reached. In this case the shoe must be replaced.

Various modes are known by which the electrical contact cable is situated in a housing and of how the housing itself is designed, for example to be attached to the carrier plate. The mounting should be as durably stable as possible, so that the positioning of the electrical cable is reliable and constant. Any alteration of the position is undesirable, because it will affect the indication. For example, it can result in the warning notice being given too early or too late. As affected by operation, the display device is subject to extremes of temperature. Therefore the materials used for it (such as plastic) must be of high quality.

Display devices are known in which the carrier plate is provided in the radially outer area with a smooth or a stepped aperture in the form of a slit. In this case, the sensor housing is compressed in radially from without into the slit. However, this type of positioning has a drawback in that operational access is not possible, because systems that hold down the shoe, such as compressing springs mounted on the carrier plate, are in the way.

From EP 692 652 A1, a wear indicator—here insulated bodies—is known which are axially compressed via a projection into a hole or a recess of the carrier plate. Axial securing is done by partially form-locking expansion, and multiple procedural steps are required for positioning. Axial pre-tensioning accomplishes the rotational securing. Only a single electrical cable is embedded (cast) in the insulated bodies, which runs radially outward axially in front of the carrier plate. In terms of manufacturing technique, this type of embedding is very expensive and also inflexible. The client's requirements for differing cable lengths must be allowed for during the casting.

A further drawback is the single-cable design. Due to that, no state-of-the-art diagnosis can be made, such as for example display, storage and query, in the vehicle as regards the functional capability of the wear display and regarding the degree of wear. Here a signal is only triggered when the cable touches the brake shoe during braking and is abraded.

DE 38 20 977 A1 exhibits multiple attachment options and sensor designs. According to a first embodiment form, a sensor of multi-component design with guidance of an open contact loop is inserted from the coating-free rear side of the carrier plate and attached there. According to another embodiment form, it is inserted radially from without. According to the first embodiment form, a part of the mounting and the cable itself extends into an area in which either clamping devices or brake caliper legs press against the carrier plate. This limits the application in state-of-the-art disc brakes for commercial vehicles, and also it is not possible to retrofit the sensor with installed brake shoes, because there is no access.

In the embodiment form with radial installation, the carrier plate must be equipped with multiple steps to make a mounting possible at all, and so that the U-shaped contact loop can be reset far enough back in the area of the carrier plate that the cable area pointing to the brake disc can display a justifiable friction lining width. But stepped carrier plates require expensive manufacturing. The steppings are also necessary if both of the legs of the U-shaped contact loop lie directly behind each other and thus are aligned transverse or perpendicular to the brake disc plane. For positioning, this kind of cable progression requires a corresponding space for installation, which has a disadvantageous effect on cost-effective utilization of the friction lining.

As shown by the preamble of claim 1, the invention is based on the teaching of DE 38 20 977 A1.

The task of it is to improve the display device according to DE 38 20 977 A1 so that the required installation space is reduced.

According to the invention, the set problem is solved in that the electrically conducting device is elongated and a section that adjoins the section that in an installed state lies closest to the brake disc forms an angle α with the plane of the brake disc which lies between 0° and 90°, preferably between 2° and 20°, and additionally preferred between 8° and 16°.

In other words, for example in the case of a U-shaped contact loop, what is avoided is that the two legs, viewed in the axial direction of the brake, lie directly behind each other, taking up a large amount of axial structural room. Rather, for example, by the above-mentioned adjoining section forming an angle α with the plane of the brake disc between 0° and 90°, the axial structural space is reduced, because the two legs of a U-shaped contact loop are placed offset to each other. By this means, as viewed in the axial direction, they can be situated considerably closer to each other, thus causing the axial structural space to be reduced.

It should be indicated expressly here that the angle α is "between" 0° and 90°, and therefore the two limit values of 0° and 90° are precluded. At 90°, in the case of the U-shaped contact loop, the two legs of the contact loop would lie axially behind each other, as is the case according to DE 38 20 977 A1. At 0°, the two legs, in the case of a U-shaped contact loop, would be next to each other in a plane lying parallel to the plane of the brake disc, and therefore after reaching the wear limit, they would be jointly abraded and worn. In such an instance, it can happen that the two cable arms simultaneously would lose holding contact and either would be destroyed by the brake disc or not even come in contact at all with the brake disc. Thus incorrect information would be issued and it would be impossible to diagnose for functionality.

This cannot occur with the invention-specific configuration. In the case of the U-shaped contact loop, the two legs are not merely at a lateral interval, they are also offset axially to each other. Therefore, one of the two legs is less worn than the other, and therefore it can still be held securely. This thus ensures permanent positioning, through which signal reliability is considerably improved. Simultaneous contact wear and wear-through are avoided, resulting in a better holding of the "residual cable" at the display point.

A further advantage as compared to cable legs lying behind each other in the case of the U-shaped contact loop is that despite the required cable cross sections, due to the offset, and while maintaining secure contact as viewed in the axial direction, the two U legs can lie relatively close to each other, through which it is possible to display an effective and economical residual shoe thickness. Only thus can a residual shoe thickness be signaled which corresponds to state-of-the-art requirements for maximum shoe implementation. This is especially so for commercial vehicles, where, for large-area brake shoes, with shoe thickness to match, a residual shoe thickness of about 2 mm is required.

According to the invention, preferably provision is made that the electrically conducting device carries current when in operation and in terms of potential when the brake is not activated, is uncoupled from the brake disc, and the current correspondingly is interrupted upon reaching a second wear limit behind the first wear limit.

Provision can also be made to direct a test current through the electrically conducting device, to check its functional capability.

Especially in the case of a U-shaped contact loop, in this case the cable leg that lies closer to the brake disc comes in contact with the brake disc first. If it is abraded, then it is drawn to the electric potential of the brake disc (for example body contact). Thereupon for example an (interrupted) warning signal is generated. The cable leg that lies closer to the brake disc issues a signal when the first wear limit is reached. This first wear limit can be so set that when it is reached, the permissible residual shoe thickness is approximately reached. If the cable leg lying closer to the brake disc is destroyed due to further abrasion, then the current through the cable loop is interrupted. This interruption of current can be used to generate an additional warning signal, for example one which persists longer. The second wear limit thus reached can be equal to the maximum permitted wear (minimum friction lining thickness).

Further preferred provision is made according to the invention that the section of the electrically conducting device that lies closest to the brake disc, upon reaching the first wear limit during braking, adjoins the brake disc, so that in the interval between the first wear limit and the second wear limit it is destroyed.

In particular, this configuration permits the functions explained individually above.

According to another preferred embodiment form of the invention, an opening is provided in a carrier plate of the brake shoe, which aligns with an opening in the friction lining, with the two openings at least partially admitting a holder for the electrically conducting device.

By this means it is possible for the invention-specific display device to be designed with particular simplicity.

Further preferred according to the invention is the opening in the friction lining that is open radially outwards. In other words, the friction lining exhibits a recess.

According to the invention, the opening (recess) in the friction lining in a further preferred fashion has the shape of a channel, especially a channel that tapers down toward the carrier plate.

This configuration facilitates deliberate axial sliding in of the holder from the side of the friction lining, for example up to the stop on the carrier plate. This facilitates and improves the positioning.

If the channel is configured to have a taper, this improves the attachment of the holder and positioning of the electrically conducting device, because a relative form-locking is generated.

Further preferred according to the invention is that the opening in the carrier plate supports the holder. By this means, a particularly simple design is implemented.

Additionally preferred is a self-acting locking of the holder the placement of the holder in response to placement of the holder into the carrier plate opening.

Such an axial securing of the holder can be configured directly or indirectly. With an indirect configuration, between a shoulder connector and a back side of the holder, a clamping plate for example is placed, which exhibits a plurality of spring-loaded tongues distributed around the circumference, which alternately point in opposite directions and are bent inward and outward. By this means the holder can be inserted so as to slide into the opening, while in contrast the spring-loaded tongues provide locking in the direction of removal. Manufacture of such a clamping sheet from a rolled band of stainless spring steel or the like is relatively simple.

Provision can also be made as part of direct mounting to embed spring-loaded tongues in the actual holder.

In both cases, a force- or form-locked mounting is present.

In contrast, a material-locked mounting can also be provided, for example by adhesive bonding, preferably with a high-temperature-resistant adhesive being used.

In additionally preferred fashion, the invention-specific device is characterized by a device based on form-locking to secure the holder against a torsion relative to the opening(s) in the carrier plate and/or the friction lining. For this purpose, for example provision can be made that the holder with at least one of its outer surfaces in its mounted state adjoins at least one inner wall of the recess in the friction lining. This solution in turn is especially simple.

According to another preferred embodiment form of the invention, provision is made that the holder exhibits a first holder channel for the section of the electrically conducting device which in the installed state is closest to the brake disc, a second holder channel for another section of the electrically conducting device placed farther from the brake disc, and a connecting channel for a connecting section of the electrically conducting device.

In other words, according to this configuration, the display device is configured for example in the form of the already above-mentioned U-shaped contact loop.

Especially with this configuration, the holder is designed to have an L-shaped cross section of the base form. One of its legs serves as an axial shoulder for mounting in the opening of the carrier plate. The area of the holder lying closer to the brake disc admits the contact loop.

Further preferred according to the invention, the connection channel, the first holder channel and/or the second holder channel have the form of an open channel.

As already mentioned above, often the length of the electrical device depends on how it is used. With closed channels in which the electrical device is embedded, especially compressed or poured, little flexibility exists in this respect, which is why expensive warehousing is required.

If the connection channel and/or the second holder channel are configured in the form of an open channel, then the (for example) thermally insulated cable of a length specified by the client can be inserted into the holder channel, to complete the device.

According to another embodiment form of the invention, provision is made that the depth of the channel is equal to, or greater than, the thickness of the section of the electrically conducting device held thereby.

With this configuration, the danger of damage is small despite the channel being open, because the electrical device is "sunken" into the channel, and by this means is protected.

In other respects the configuration can also be chosen so that the open side of the channel adjoins a surface of the recess, through which the originally open channel is closed.

Especially implementing the second holder channel in the form of an open channel, preferably open laterally, facilitates mounting. By means of suitable cross sectional contours that taper or are offset to each other—depending on the cable dimension—the cable can be accommodated and clamped therein in a positionally and functionally safe manner. Thus the insertion of the cable can be improved while maintaining functional safety.

If the first holder channel also has the form of an open channel, after insertion into the holder channels, the two sections of the electrically conducting device that project out of the channels can be twisted relative to each other for improved mounting.

In its installed state, the electrically conducting device is at a small interval from the brake disc as a carrier plate of the brake shoe.

In other words, the electrically conducting device does not lie within the carrier plate, which has substantial advantages as regards the overall structure. What is particularly achieved is independence of whether there is a present a system for holding the brake down (in whatever configuration), and whether the electrical device is placed above it or below it. In addition, the electrical device also does not run in the contact area of a possible clamping system or a leg of the brake caliper. Thus, it is also possible to either retrofit the wear display device in a brake with an already installed brake shoe, or replace a possibly defective display device.

The invention is usable independent of whether the electrical device is sheathed or not. Preferably it is surrounded by a heat-resistant shielding. Also, preferably the holder is made of a heat-resistant material Especially a plastic such as a polyimide comes into consideration as a material. A duroplast is also conceivable, however.

Although the invention concept has been described above using cables laid at intervals to each other and offset relative to each other, with an axial attachment, it is also applicable in the case of radial attaching parts or fastenings corresponding to the above-described prior art. With these also the invention-specific advantages are attainable. For also in such an instance the functional safety is increased and the versatility is improved.

Express reference is made to the fact that the invention especially is applicable to commercial vehicles.

Along with the above-mentioned wear display device, the invention also provides a disc brake with such a wear display device.

Lastly, the invention also provides a brake shoe for such a disc brake.

BRIEF DESCRIPTION OF THE DRAWINGS

In what follows, the invention is described in greater detail using a preferred embodiment example while referring to the appended drawings with further particulars. Shown are.

DETAILED DESCRIPTION OF EMBODIMENTS

The drawings show a brake shoe 10, which exhibits a carrier plate 12 and a friction lining 14. The carrier plate 12 has an opening 16. The friction lining 14 has a channel-shaped recess 18, which aligns with opening 16. As can especially seen from FIG. 1, the recess 18 tapers down toward opening 16.

Figure 1:
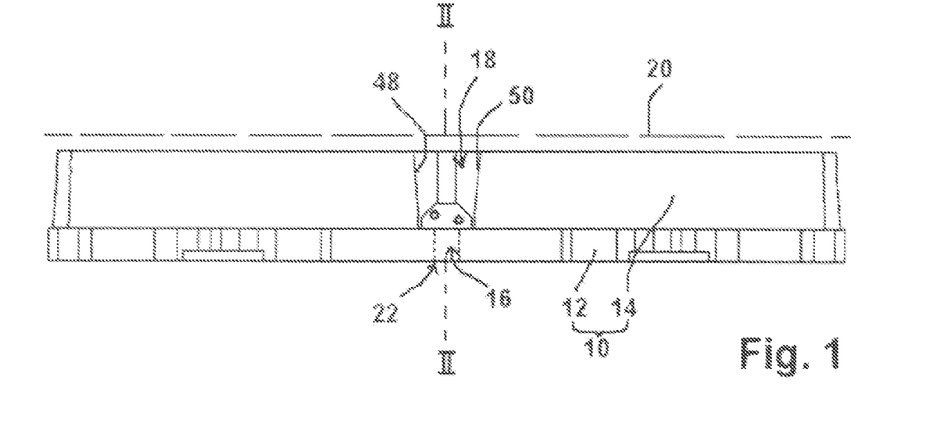
FIG. 1—a schematic top-down view of a brake shoe with a wear display device according to one embodiment example of the invention.

FIG. 1 also shows a brake disc plane which is designated with reference number 20.

Figure 2:
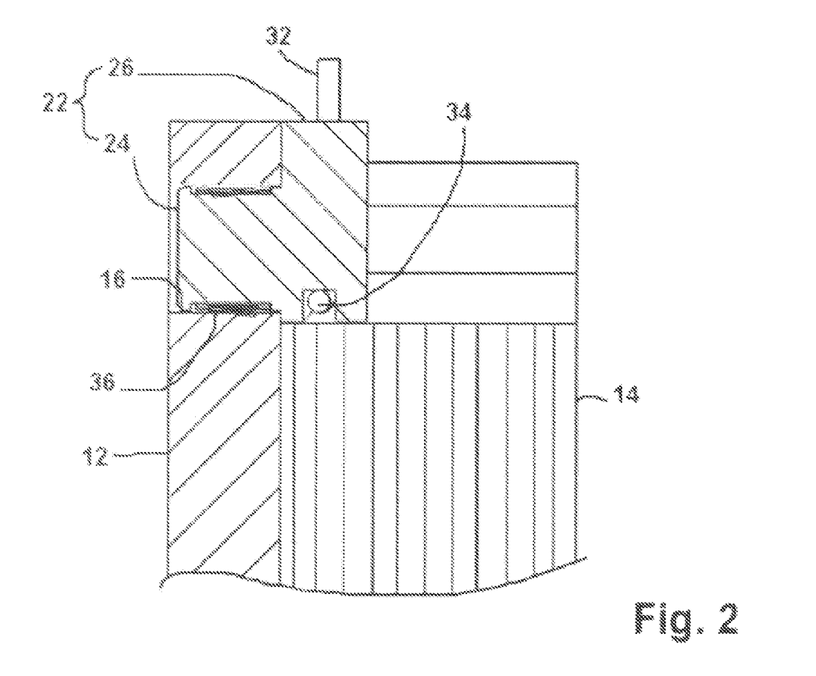
FIG. 2—a schematic sectional view along line II-II of FIG. 1.
Figure 3:
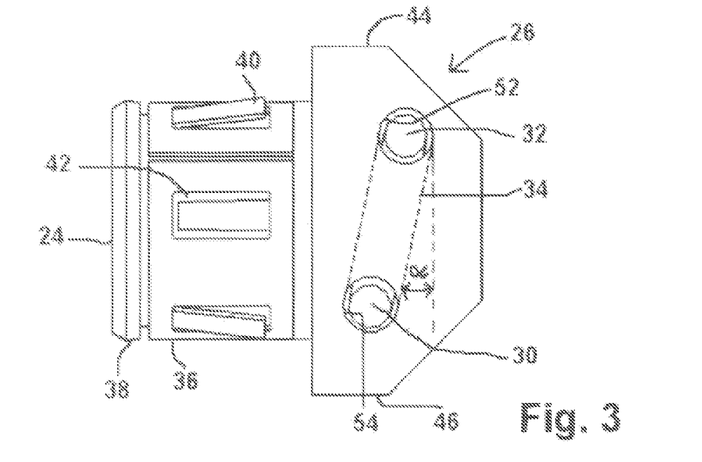
FIGS. 3 to 7—views of a holder for the wear display device according to FIG. 1.

According to FIG. 2, opening 16 and recess 18 admit a holder 22 of a wear display device. According to FIG. 2, holder 22 in the sectional view is L-shaped, with a projection 24 of holder 22 inserted into opening 16, while in contrast a head 26 of holder 22 is situated in recess 18. In the head 26 of holder 22 is an essentially U-shaped loop made of an electrically conducting cable which overall is designated by the reference number 28. The "U" has two legs 30 and 32, which are connected with each other via an arch-shaped connecting section 34. The cable loop 28 has a heat-resistant sheath made of a plastic, such as polyimide. A duroplastic is also conceivable, however. The holder 22 is also made of a heat-resistant material.

Figure 10:
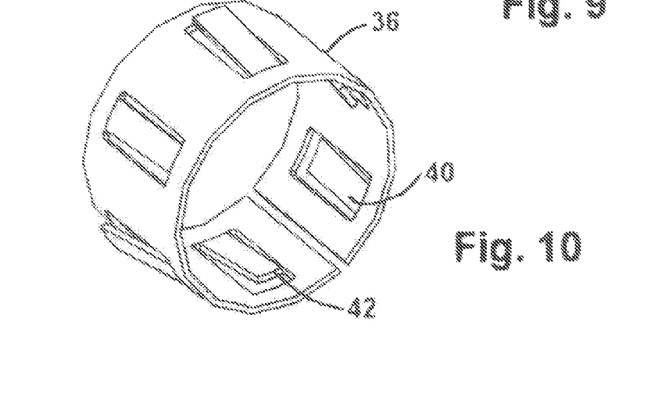
FIG. 10—a schematic perspective view of a clamping plate with spring-loaded tongues for the wear display device according to FIG. 1.

To axially secure holder 22 in opening 16, a clamping sheet 36 is in the form of a slotted ring, which is positioned by means of a radial connector 38 on holder 22. The clamping sheet exhibits spring-loaded tongues, of which two are labeled for example by reference numbers 40 and 42. The spring-loaded tongue 40 projects radially out, and spring-loaded tongue 42 projects radially in. They lock in response to holder projection 24 being slid into opening 16 with a corresponding step in the inner wall of opening 16 or on the outer wall of projection 24. By this means, holder 22 is secured in the axial direction after insertion into opening 16.

Safeguarding against a twisting within opening 16 are flat surfaces 44 and 46 on holder head 26, which, in an installed state, come to a stop on the inner side 48 or 50 of recess 18 when twisting occurs.

Figure 4:
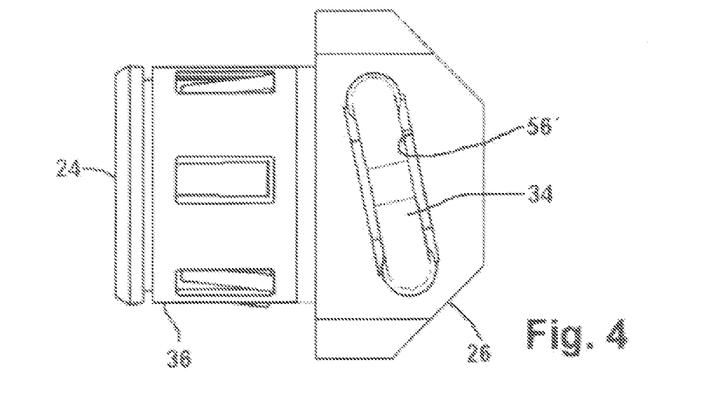
Figure 5:
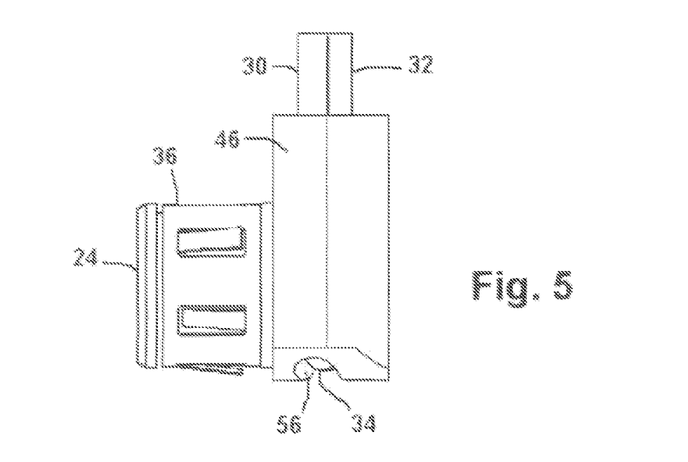
Figure 6:
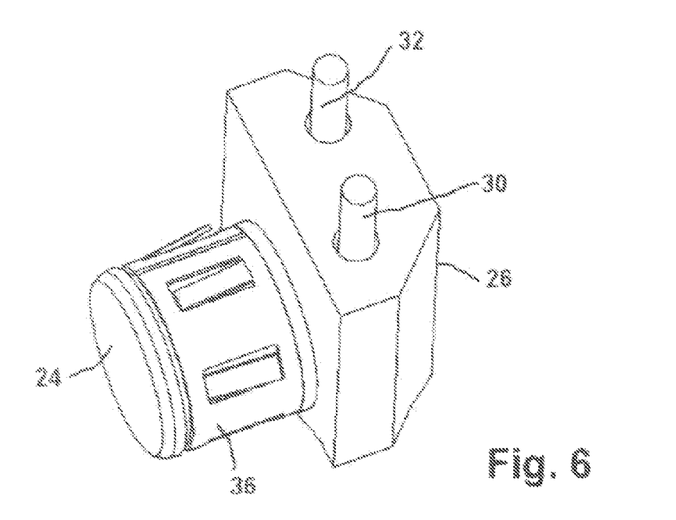
Figure 7:
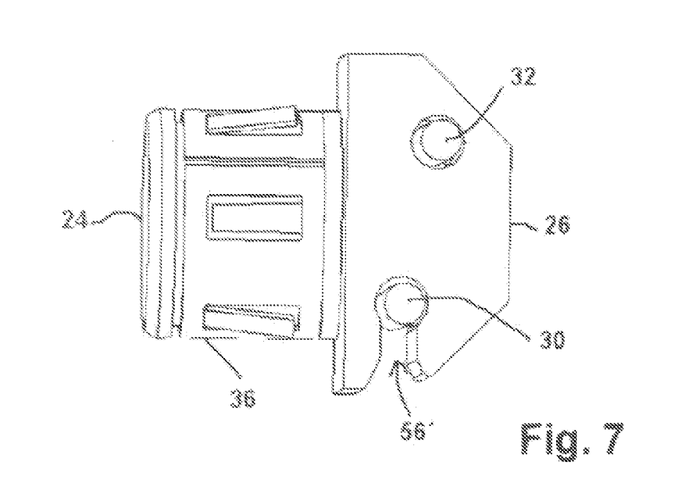
Figure 8:
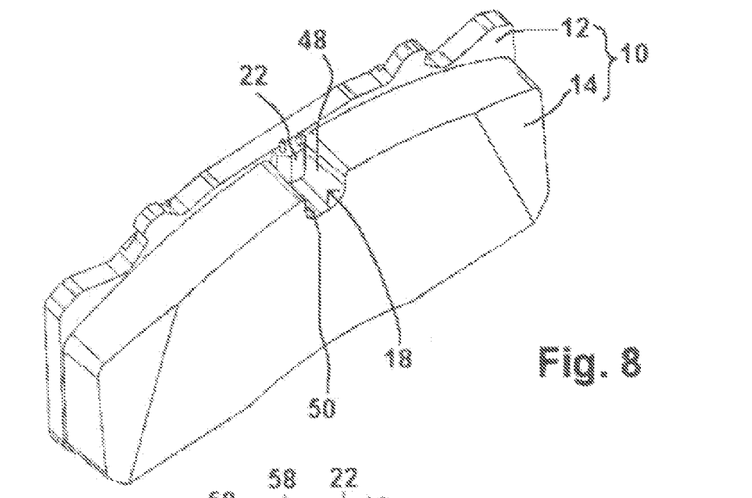
FIG. 8—a schematic perspective view of the brake shoe with a wear display device according to FIG. 1.

The holder 22 or its head 26 exhibits two holder channels 52 and 54 to admit the two legs 32 and 30 as well as a connector channel 56 to admit the connector section 34. As can especially be seen in FIGS. 4, 5 and 7, the channels 54 (only with the embodiment form as per FIG. 7) and 56 are configured as open channels, which strongly facilitates insertion of the cable 28 into holder 22. Holder channel 52 can also be designed as an open channel. The depth of channels 54 and 56 and if necessary of channel 52 is greater than the thickness of cable 28, by which cable 28 is securely held in the two channels. Under certain circumstances it also suffices if the channel depth is equal to the cable thickness. As can in addition be gleaned especially from FIG. 7, that area in which the leg 30 of cable 28 is held, is wider than an entry area of the channel, which leads to a still better holding of leg 30 in holder 22 or its head 26. The same holds true for channel 56 and if necessary channel 52.

The sections 30, 32 of the cable that project out from holder channels or grooves 52 and 54 can be twisted with each other for further improvement of the mounting.

Figure 9:
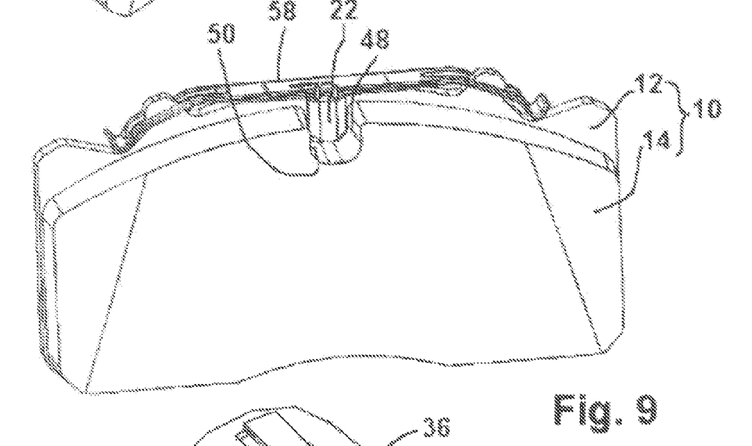
FIG. 9—the same view as FIG. 8, but from a somewhat different perspective and with a retaining spring.

In the embodiment example depicted in the drawing, holder 22 with its projection 24 is slid into opening 16 axially from the coating side in the axial direction of the brake. This is also possible if a retaining spring 58 has been mounted.

However, the invention is not limited to this embodiment form. Rather, it also covers embodiments in which the holder is not inserted axially, but rather radially.

The connecting section 34 forms an angle α with the brake disc plane 20, which in the embodiment example depicted in the drawing amounts to about 12°, because the leg 30 of cable 28 lies next to leg 32, but also is farther removed from brake disc plane 20 than leg 32.

In operation, cable loop 28 is electrically at another potential than the brake disc and has a current flowing through it. If the friction lining has been heavily worn away, during braking, leg 32 of cable loop 28 reaches the brake disc and is drawn electrically to its potential. This potential change is detected, and a first warning signal, a blinking one for example, is generated. Since the connecting section 34 forms the angle α with the brake disc plane 20, then with further abrasion of the friction lining 14 and thus of contact loop 28, the loop 30 is not affected over a longer operational duration. Rather it is reliably held in channel 54.

But at some point, further abrasion results in leg 32 being destroyed and/or separated from connecting section 34. By this means, the current flowing through cable loop 28 is interrupted. This interruption is also detected, and now a warning signal is generated that no longer blinks, but rather is continuous. During the first warning signal, only a preliminary warning was given to the effect that in the near future the brake shoe must be replaced, but the continuous warning signal indicates having reached the maximum permissible wear limit, so that the brake shoe must be replaced without delay.

The features disclosed in the above specification, claims and the drawings may be essential also in various combinations for the implementation of the invention in its varied embodiment forms.

The invention claimed is:

1. A disc brake comprising:
   a brake disc;
   a brake shoe, the brake shoe including a carrier plate and a friction lining attached to the carrier plate; and
   a device attachable to the brake shoe for displaying wear of the friction lining of the shoe of the disc brake, the device including and an electrically conducting device which, upon reaching a first predetermined wear limit during braking comes into electrical contact with the brake disc, wherein the electrically conducting device comprises a U-shaped structure that includes a first and second elongated sections extending in a direction parallel to a braking surface face of the friction lining and adjoined with an arch-shaped connecting section, wherein the connecting section of the electrically conducting device in an installed state forms an angle with the braking surface of the friction lining and of the brake disc, such that one of the first or second sections is disposed closer to the braking surface of the friction lining and the brake disc than another one of the first or second sections, wherein the angle comprises a range between 2° and 20°, and wherein the plane of the brake disc is substantially parallel to the friction lining surface and the carrier plate of the brake shoe.

2. The disk brake according to claim 1, characterized in that
   the electrically conducting device carries current in operation and when the brake is not activated, is distinct in potential from the brake disc and
   the current appropriately is interrupted upon reaching a second wear limit situated beyond the first wear limit.

3. The disk brake according to claim 2, characterized in that the second section of the electrically conducting device that lies closest to the brake disc, upon reaching the first wear limit during braking, adjoins the brake disc, so that it is destroyed in the interval between the first wear limit and the second wear limit.

4. The disk brake according to claim 1, characterized in that an opening in the carrier plate of the brake shoe aligns with an opening in the friction lining, wherein the two openings at least partially admit a holder for the electrically conducting device.

5. The disk brake according to claim 4, characterized in that the the friction lining comprises a recess.

6. The disk brake according to claim 4, characterized in that the opening in the friction lining has the form of a channel.

7. The disk brake according to claim 6, wherein the channel tapers down toward the carrier plate.

8. The disk brake according to claim 4, characterized in that the opening in the carrier plate holds the holder.

9. The disk brake according to claim 4, characterized by a self-acting locking of the holder in response to the insertion of the holder into the opening of the carrier plate.

10. The disk brake according to claim 4, wherein the holder is secured against twisting relative to the opening in the carrier plate or the friction lining.

11. The disk brake according to claim 4, characterized in that the holder exhibits
    a first holder channel for the section of the electrically conducting device that in an assembled state lies closest to the brake disc
    a second holder channel for another section of the electrically conducting device lying farther from the brake disc, and
    a connecting channel for a connecting section of the electrically conducting device.

12. The disk brake according to claim 11, characterized in that the connecting channel, the first holder channel and/or the second holder channel have the form of an open channel.

13. The disk brake according to claim 12, characterized in that the depth of the channel is equal to or greater than the thickness of the section of the electrically conducting device held thereby.

14. The disk brake according to claim 1, characterized in that the electrically conducting device in an installed state has a smaller interval from the brake disc than a carrier plate of the brake shoe.

15. The disk brake according to claim 1, wherein the angle further comprises a range between 8° and 16°.

* * * * *